United States Patent Office 3,143,466
Patented Aug. 4, 1964

3,143,466
N-(BETA-HALOPROPIONYL)-PIPERIDINES
AS CNS DEPRESSANTS
Leo G. Abood, Oak Park, Ill., assignor to Colgate-Palmolive Company, a corporation of Delaware
No Drawing. Filed Feb. 1, 1962, Ser. No. 170,507
4 Claims. (Cl. 167—65)

This invention relates to novel chemical compounds and processes of producing the same. More particularly, this invention is concerned with derivatives of piperidine having useful medicinal properties.

This application is a continuation-in-part of copending application Serial No. 70,910, filed November 22, 1960, now abandoned, and copending application Serial No. 128,355, filed August 1, 1961, and now abandoned.

According to the present invention there are provided novel beta-halopropionylpiperidines of the formula

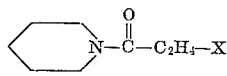

wherein X is chloro or bromo.

The novel N-(beta-halopropionyl)-piperidines are produced by reacting piperidine with a beta-halopropionyl halide in a suitable liquid reaction medium. This reaction can be represented as follows:

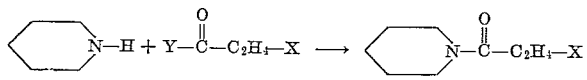

wherein X is chloro or bromo and Y is a reactive halo such as chloro or bromo. Solvents such as benzene, toluene, xylene, ether and tetrahydrofuran can be employed as the reaction medium. An acid acceptor, such as potassium carbonate, is usually provided in the reaction mixture to remove hydrogen chloride as it is formed. The reaction proceeds at room temperature although slightly lower temperatures are advisably employed to control the reaction rate. After the reaction is complete, the mixture can be filtered and the liquid reaction medium separated by distillation leaving the product as a residual oil. The product can then be purified by fractional distillation under reduced pressure.

N-(beta-chloropropionyl)-piperidine and N-(beta-bromopropionyl)-piperidine are analgetic agents with skeletal muscle relaxant properties. Greatest activity is obtained with N-(beta-chloropropionyl)-piperidine.

At a dose of 100 mg./kg. of N-(beta-chloropropionyl)-piperidine intraperitoneally in rats, a marked analgesia and a moderate degree of muscle relaxation is produced. At a dose of 200 mg./kg. of this compound the analgesia is complete, while the degree of muscle relaxation is very marked. N-(beta-chloropropionyl)piperidine has an LD₅₀ in excess of 700 mg./kg. so that it has a good therapeutic index. Orally, the drug is effective at doses of 500 mg./kg. as an analgesic and muscle relaxant. Animals (rats) premedicated with 100 mg./kg. intraperitoneally of N-(beta-chloropropionyl)-piperidine failed to produce any hyperactivity, as measured in a hyperactivity cage, upon the administration of a dose of 5 mg./kg. intraperitoneally of N-methyl-3-piperidyl benzilate HCl five minutes thereafter. The later compound is known to produce very marked hyperactivity in animals previously untreated with other drugs.

N-(beta-chloropropionyl)-piperidine and N-(beta-bromo-propionyl)-piperidine have antianxiety, calming and tranquilizing properties in animals. They are antipsychotic agents useful in treating neurotics and schizophrenics. These agents produce a calming and tranquilizing effect on tense, anxious, neurotic patients. Neurotics appear to be less emotional and less agitated after receiving these agents. They are better able to cope with their environment and are more amenable to psychotherapy. These agents also appear to be effective in treating paranoid delusions, hallucinations, confusional states, and catatonic symptoms of schizophrenic patients. Such patients become more communicative, more sociable, less aggressive and more organized in their thinking and affect.

The compounds of this invention can be administered to animals and humans in suitable pharmaceutical unit dosage forms such as drops, solutions and capsules. Any suitable safe and effective amount of active agent may be employed in such unit dosage forms although from 25 to 500 mg. is suitable but will, of course, depend on the size of the animal or human to be treated. Daily administration of 100 mg. to 1500 mg. is effective in many cases with 200 mg. to 1000 mg. being more general. Pharmaceutical carriers, lubricants, binders and disintegrating agents can be used as warranted.

Preliminary studies have shown that these compounds have antitumor activity in animals. N-(beta-chloropropionyl)-piperidine was tested against the following tumors: Mast cell, S 180, CA 755 and L 1210, using DBA-2 and Swiss mice and tissue culture techniques. The drug was moderately effective against these tumors. The dose used was 100–300 mg./kg. intraperitoneally once daily. The effect is evident after two to three weeks. The bromine analog is equally, if not more, effective.

The following examples are presented to illustrate the preparation of the novel compounds provided by this invention.

EXAMPLE 1

N-(Beta-Chloropropionyl)-Piperidine

To a mixture containing 17 g. (0.20 mole) of piperidine, 27.6 g. (0.20 mole) of potassium carbonate and 200 cc. of dry benzene at 10° C. was added dropwise 25.4 g. (0.20 mole) of beta-chloropropionyl chloride in 100 cc. of benzene. The mixture was stirred at 10° C. for 4 hours, the solids removed by filtration and the filtrate washed successively with 5% sodium bicarbonate solution, 10% hydrochloric acid and water. The organic phase was dried with potassium carbonate, the solvent removed by distillation and the product collected at 78–80° C. (0.04 mm.), yield 9.0 g.

Analysis.—Calcd. for C₈H₁₄ClNO: Cl, 20.18. Found: Cl, 19.78.

EXAMPLE 2

N-(Beta-Bromopropionyl)-Piperidine

To 34.2 g. (0.2 mole) beta-bromopropionylchloride in 100 ml. of dry benzene at 10° C. was added dropwise 34.2 g. (0.4 mole) of piperidine in 100 ml. of dry benzene. The mixture was stirred at 10° C. or less for 4 hours and then warmed slowly to room temperature. The solids were filtered off and washed well with dry benzene. The benzene filtrates were concentrated in vacuo and the residue distilled through a 2″ column in vacuo (Megavac), B.P. 87–90° C./0.02 mm., 35.5 g. (80%). Some material solidified.

Analysis.—Calcd. for C₈H₁₄BrNO: Br, 36.31; N, 6.36. Found: Br, 36.49; N, 6.45.

Various changes and modifications of the invention can be made and, to the extent that such variations incorporate the spirit of this invention, they are intended to be included within the scope of the appended claims.

What is claimed is:

1. A pharmaceutical composition comprising about 25 to 500 mg. of a member of the group consisting of N-(beta-chloropropionyl)-piperidine and N-(beta-bromopropionyl)-piperidine, and a pharmaceutical carrier.

2. A pharmaceutical capsule containing about 25 to 500 mg. of a member of the group consisting of N-(beta-chloropropionyl)-piperidine and N-(beta-bromopropionyl)-piperidine, and a pharmaceutically acceptable carrier.

3. The method of inducing analgesia and muscle relaxation in an animal which comprises administering a safe but effective amount of a member of the group consisting of N-(beta-chloropropionyl)-piperidine and N-(beta-bromopropionyl)-piperidine to the animal.

4. The method of lowering anxiety and inducing a calming and tranquilizing effect in an animal which comprises administering a safe but effective amount of a member of the group consisting of N-(beta-chloropropionyl)-piperidine and N-(beta-bromopropionyl)-piperidine to the animal.

References Cited in the file of this patent

UNITED STATES PATENTS

| | | |
|---|---|---|
| 2,911,408 | Biel | Nov. 3, 1959 |
| 2,916,417 | Horrom | Dec. 8, 1959 |
| 2,971,956 | Wright | Feb. 14, 1961 |
| 2,976,213 | Murphey | Mar. 21, 1961 |

OTHER REFERENCES

Chiavarelli and Betollo: Chem. Abst., vol. 45, pp. 8990–8991, 1951.

Nikitskaya: Chem. Abst., vol. 53, p. 21936, 1959.